US009580056B2

(12) United States Patent
Ishino et al.

(10) Patent No.: US 9,580,056 B2
(45) Date of Patent: Feb. 28, 2017

(54) VEHICLE BRAKE DEVICE

(71) Applicant: HONDA MOTOR CO., LTD., Tokyo (JP)

(72) Inventors: Keisuke Ishino, Wako (JP); Shuichi Okada, Wako (JP); Kohei Akamine, Wako (JP); Kunimichi Hatano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/897,524

(22) PCT Filed: Jun. 13, 2013

(86) PCT No.: PCT/JP2013/003720
§ 371 (c)(1),
(2) Date: Dec. 10, 2015

(87) PCT Pub. No.: WO2014/199419
PCT Pub. Date: Dec. 18, 2014

(65) Prior Publication Data
US 2016/0114775 A1 Apr. 28, 2016

(51) Int. Cl.
G06F 7/70 (2006.01)
B60T 13/66 (2006.01)
(Continued)

(52) U.S. Cl.
CPC ........... B60T 13/662 (2013.01); B60T 7/042 (2013.01); B60T 8/4081 (2013.01);
(Continued)

(58) Field of Classification Search
CPC combination set(s) only.
See application file for complete search history.

(56) References Cited

U.S. PATENT DOCUMENTS 8,812,212 B2* 8/2014 Tomlinson ............ B60T 13/662
701/72
9,020,691 B2* 4/2015 Svensson ................ B60T 13/66
701/33.6
(Continued)

FOREIGN PATENT DOCUMENTS

JP H11189144 7/1999
JP 2004-122817 4/2004
(Continued)

OTHER PUBLICATIONS

Japanese Office Action dated May 10, 2016 with relevant portion of English Translation, 6 pages.
(Continued)

Primary Examiner — Hussein A. Elchanti
(74) Attorney, Agent, or Firm — Rankin, Hill & Clark LLP

(57) ABSTRACT

A target control value of the brake fluid pressure generated in dependence on the braking operation amount is set by using a first coefficient determined in dependence on the vehicle speed in an early phase of a braking operation performed by a vehicle operator and a second coefficient determined in dependence on the braking operation amount and the vehicle speed during a later braking action. The increase in the braking force for the buildup control can be restrained in an early phase of the braking operation so that the onset of deceleration in an early phase of the braking action for the given braking operation can be made gradual in a manner corresponding to the vehicle speed while a favorable buildup control is achieved by increasing the deceleration as the vehicle speed decreases in the course of the braking action.

10 Claims, 10 Drawing Sheets

(51) Int. Cl.
  *B60T 8/40* (2006.01)
  *B60T 7/04* (2006.01)
  *B60T 13/14* (2006.01)
  *B60T 13/68* (2006.01)
  *B60T 13/74* (2006.01)

(52) U.S. Cl.
  CPC .......... *B60T 13/146* (2013.01); *B60T 13/686* (2013.01); *B60T 13/745* (2013.01); *B60T 2201/03* (2013.01); *B60T 2220/04* (2013.01)

(56) References Cited

U.S. PATENT DOCUMENTS

| | | | | |
|---|---|---|---|---|
| 2001/0032045 A1* | 10/2001 | Hano | .............. | B60T 8/172 701/80 |
| 2005/0225170 A1 | 10/2005 | Tsunehara | | |
| 2007/0236080 A1* | 10/2007 | Harrison | .............. | B60T 8/1755 303/11 |
| 2008/0079309 A1 | 4/2008 | Hatano et al. | | |
| 2008/0093919 A1* | 4/2008 | Klug | .............. | B60T 8/4059 303/11 |
| 2008/0116740 A1 | 5/2008 | Yokoyama et al. | | |
| 2009/0115242 A1* | 5/2009 | Ohtani | .............. | B60T 7/042 303/3 |
| 2011/0029215 A1* | 2/2011 | Willmann | .............. | B60T 7/042 701/78 |
| 2012/0112524 A1* | 5/2012 | Shibata | .............. | B60T 13/146 303/10 |

FOREIGN PATENT DOCUMENTS

| | | |
|---|---|---|
| JP | 2004-122819 | 4/2004 |
| JP | 2005-343185 | 12/2005 |
| JP | 2007-38794 | 2/2007 |
| JP | 2010-76468 | 4/2010 |

OTHER PUBLICATIONS

Australian Patent Examination Report dated Aug. 5, 2016, 8 pages.

* cited by examiner

VEHICLE BRAKE DEVICE

FIELD OF THE INVENTION

The present invention relates to a vehicle brake device, and in particular to a vehicle brake device that produces a braking force by using an electric actuator.

BACKGROUND OF THE INVENTION

Conventionally, a vehicle brake device using a brake-by-wire technology is known which uses a hydraulic cylinder actuated by an electric actuator such as an electric motor to produce a brake pressure. It is known that the braking force tends to be reduced toward a latter part of a braking action when the brake pedal is depressed by a constant stroke owing to the mechanical property of the brake device, and this may prevent the vehicle from slowing down at a deceleration intended by the vehicle operator. Therefore, the vehicle operator has to depress the brake pedal further in order to achieve a desired deceleration, and this may complicate the braking operation for the vehicle operator.

In the case of the brake-by-wire system which uses an electric actuator configured to be operated so as to produce a brake fluid pressure corresponding to the depression stroke of the brake pedal (braking operation amount), in order to overcome such a problem, the electric actuator may be controlled such that the braking force or the deceleration is increased as the vehicle speed decreases during the course of the braking action so that a decrease in the braking force or a decline in the deceleration owing to the reduction in the frictional coefficient may be avoided (or the so-called buildup effect may be enhanced). See Patent Document 1, for instance.

According to the technology disclosed in Patent Document 1, the ratio of the target braking force (brake fluid pressure) or the target deceleration to the depression stroke of the brake pedal (braking operation amount) is varied depending on the vehicle speed. In particular, the ratio of the target braking force (target deceleration) to the depression stroke of the brake pedal is increased with a decrease in the vehicle speed so that the target braking force (target deceleration) increases with a decrease in the vehicle speed even though the depression stroke of the brake pedal is constant. It is said that a good braking action can be thereby achieved in a late phase of the braking action.

PRIOR ART DOCUMENT(S)

Patent Document(s)

Patent Document 1: JPH11-189144A

SUMMARY OF THE INVENTION

Task to be Accomplished by the Invention

However, the factors that may affect the brake control include, in addition to the vehicle speed, changes in the braking operation amount (brake pedal depression stroke) controlled by the vehicle operator. The conventional brake control may not be able to cope with the case where the braking operation amount changes during the course of a braking operation.

Means to Accomplish the Task

A primary task of the present invention is therefore to restrain a decline in the braking force in a late phase of a braking action in a vehicle brake device and allow the braking action to be performed as intended by the vehicle operator. To accomplish such a task, the present invention provides a vehicle brake device, comprising: an operation amount detection means (124) for detecting a braking operation amount of a braking operation member (2) operated by a vehicle operator; a fluid pressure generation means (131) for generating a brake fluid pressure in dependence on the braking operation amount by actuating an electric actuator (4); a vehicle speed detection means (126) for detecting a vehicle speed; and a buildup control means (132, 133) for increasing the brake fluid pressure with a decrease in the vehicle speed when the brake fluid pressure is generated by the fluid pressure generating means in dependence on the braking operation amount; wherein the buildup control means is configured to adjust a target control value set in dependence on the braking operation amount by taking into account the vehicle speed and the braking operation amount at an initial time point of a braking operation by the vehicle operator.

According to this arrangement, in an early phase of a braking operation, because the target control value for the buildup control corresponding to the current braking operation amount is adjusted by taking into account the current vehicle speed, the increase in the brake fluid pressure for the buildup control is reduced so that the onset of deceleration in an early phase of the braking action for a given braking operation amount can be made gradual in a manner corresponding to the vehicle speed. During the course of the braking action, the target control value is adjusted in response to the change in the vehicle speed and the change in the braking operation amount so that a favorable buildup effect may be achieved by increasing the level of deceleration with a decrease in the vehicle speed. At the same time, the changes in the deceleration for a given change in the braking operation amount can be controlled so that the changes in the level of deceleration can be made more mild, and the brake control for a given change in the braking operation amount can be improved.

In particular, the target control value may be adjusted by using a first coefficient determined in dependence on the vehicle speed and a second coefficient determined in dependence on the braking operation amount and the vehicle speed during a braking action.

According to this arrangement, by selecting the first coefficient so that the increase of the brake fluid pressure for the buildup control is restrained in dependence on the vehicle speed, and the second coefficient so that the changes in the vehicle speed and brake fluid pressure during the course of the braking action may be taken into account, a favorable brake control covering an early phase of the braking action and the buildup control in a late phase of the braking action can be achieved by means of a simple computational process using such coefficients.

The first coefficient may become greater with an increase in the vehicle speed, and may be fixed at a constant value during the braking action. Thereby, the increase in the brake fluid pressure for the buildup control may be restrained when the vehicle speed is low, and the increase in the brake fluid pressure for the buildup control may not be restrained when the vehicle speed is high so that, for a given depression stroke of the brake pedal, the generation of the braking force is relatively restrained when the vehicle speed is low, and the braking force may be generated in a relatively early phase of the braking action when the vehicle speed is high. Also, because the first coefficient is fixed during the braking operation, the vehicle operator is prevented from experiencing any discomfort.

According to a preferred embodiment of the present invention, the second coefficient changes by a relatively small amount for a given change in the vehicle speed when the vehicle speed is higher than a prescribed vehicle speed, and by a relatively great amount for a given change in the vehicle speed when the vehicle speed is lower than the prescribed vehicle speed. Thereby, when the vehicle speed is higher than the prescribed intermediate vehicle speed, the buildup effect may be reduced for a given decrease in the vehicle speed so that a stable vehicle behavior can be achieved. Also, the buildup effect may be increased for a given decrease in the vehicle speed when the vehicle speed is low so that an appropriate buildup effect may be achieved.

It may be arranged such that the second coefficient approaches 1 as the braking operation amount increases. Thereby, when an operation is performed to increase the braking operation amount during the course of the braking operation, the target control value is prevented from changing excessively in a corresponding manner so that a favorable control action can be achieved even when the braking operation amount is sharply increased.

The target control value may consist of a brake fluid pressure that is generated in dependence on the braking operation amount. Thereby, the target value and the actually measured value of the brake fluid pressure can be directly compared to each other so that a highly responsive control action can be achieved.

Effect of the Invention

According to the present invention, it is possible to perform control so as to achieve an optimum buildup effect in accordance with the vehicle speed and the brake pedal depression stroke representing the state of the vehicle during a braking action.

DETAILED DESCRIPTION OF THE INVENTION

Figure 1:
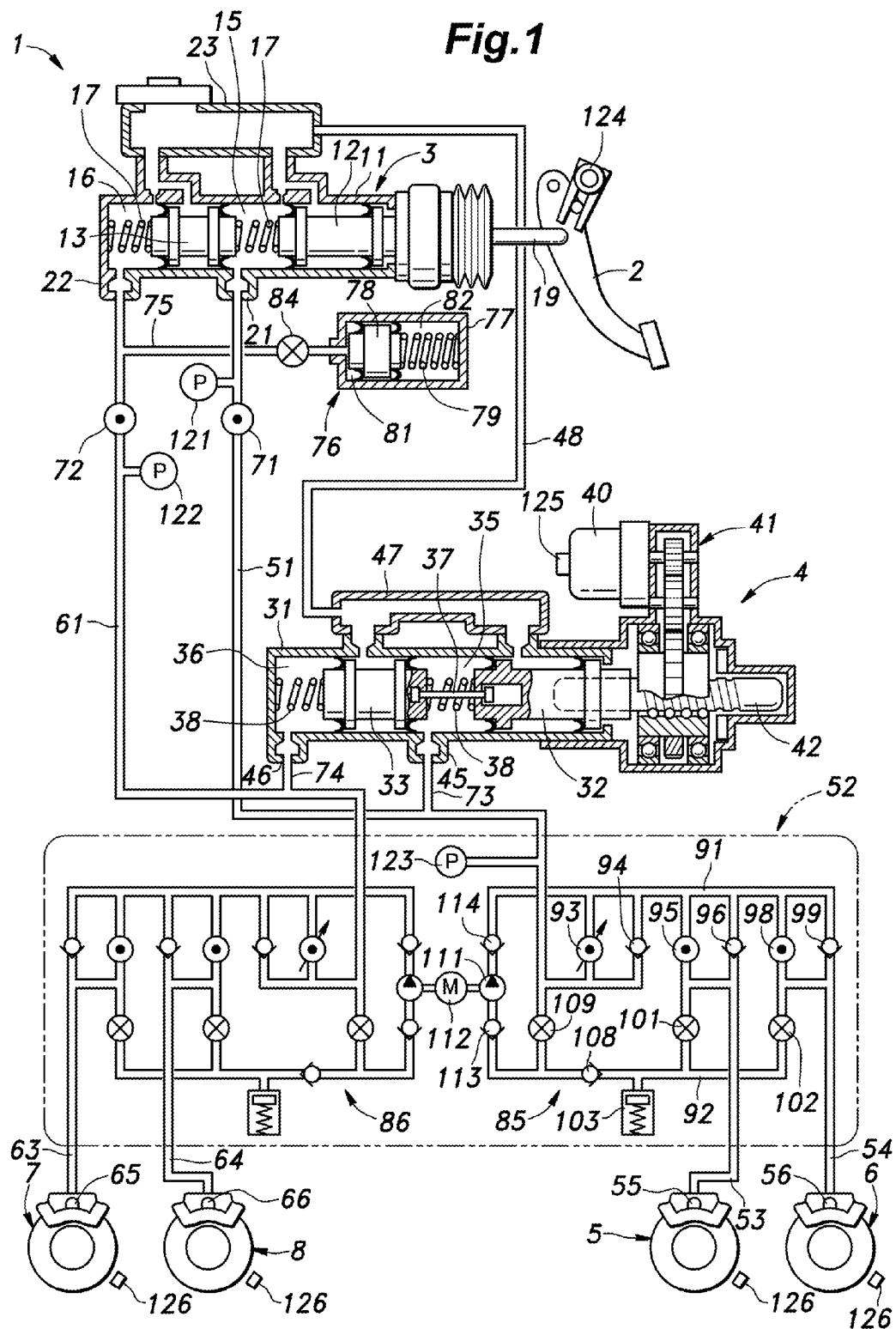
FIG. 1 is a view showing a hydraulic circuit of a vehicle brake device 1.
Figure 2:
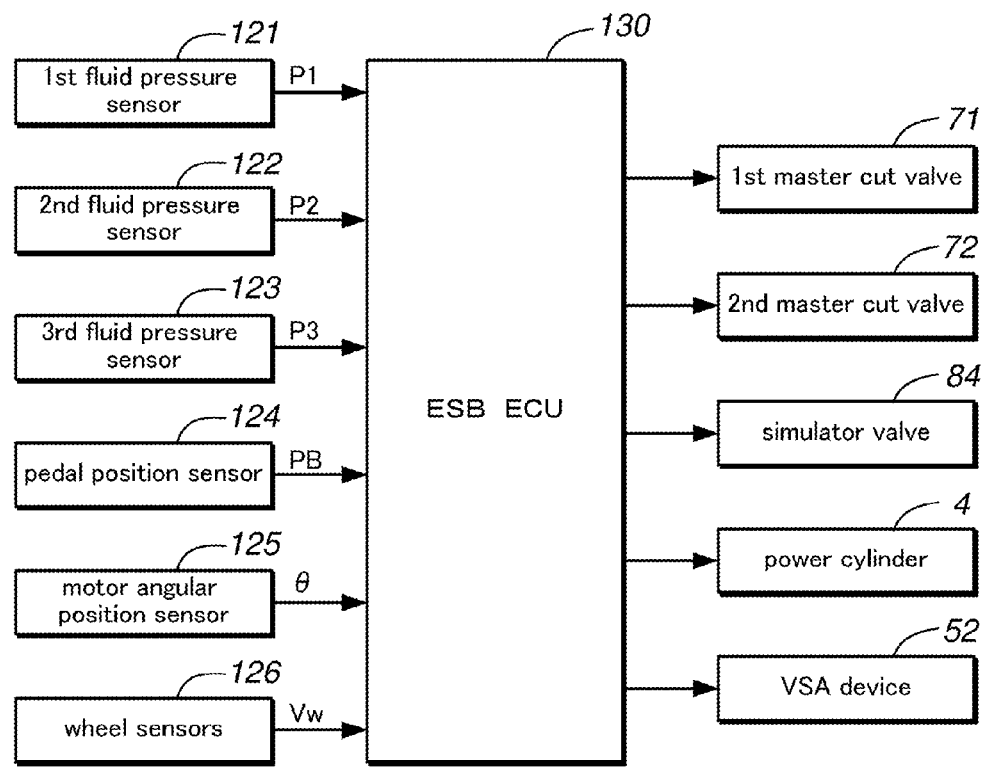
FIG. 2 is a block diagram showing a control system of the vehicle brake device.

A preferred embodiment of the present invention is described in the following with reference to the appended drawings. FIG. 1 is a view showing a hydraulic circuit of a vehicle brake device 1, and FIG. 2 is a block diagram showing a control system of the vehicle brake device. As shown in FIGS. 1 and 2, the vehicle brake device of the illustrated embodiment includes a brake pedal 2 serving as a braking operation member pivotally supported on the vehicle body, a master cylinder 3 and a power cylinder 4 for producing a hydraulic pressure in dependence on the depression stroke of the brake pedal 2, and disk brakes 5, 6, 7 and 8 that are actuated by the hydraulic pressure supplied by the master cylinder 3 or the power cylinder 4 thereto.

The master cylinder 3 consists of a tandem cylinder including a cylindrical master housing 11, a first master piston 12 and a second master piston 13 slidably received in the master housing 11. The first master piston 12 is positioned axially in a rear part of the master housing 11, and the second master piston 13 is positioned axially in a front part of the master housing 11. A first master fluid pressure chamber 15 is defined between the first master piston 12 and the second master piston 13, and a second master fluid pressure chamber 16 is defined between the front end of the master housing 11 and the second master piston 13. A return spring 17 consisting of a compression coil spring is interposed between the first master piston 12 and the second master piston 13, and another return spring 17 consisting of a compression coil spring is interposed between the second master piston 13 and the opposing end of the master housing 11. These return springs 17 urge the first master piston 12 and the second master piston 13 in the rearward direction of the master housing 11. The first master piston 12 and the second master piston 13 in this condition are considered to be at the initial positions.

An end of a rod 19 engages the first master piston 12, and extends axially rearward out of the master housing 11. The projecting end of the rod 19 is pivotally connected to the brake pedal 2. Therefore, when the brake pedal 2 is depressed, the first master piston 12 and the second master piston 13 are displaced in the forward direction of the master housing 11 against the spring forces of the return springs 17.

The master housing 11 is provided with a first master output port 21 communicating with the first master fluid pressure chamber 15, and a second master output port 22 communicating with the second master fluid pressure chamber 16. The master housing 11 is provided with a master reservoir tank 23 which supplies brake oil to the first master fluid pressure chamber 15 and the second master fluid pressure chamber 16 via fluid passages (not numbered) formed in the master housing 11. Owing to per se known seal members (not numbered) that seal off the master reservoir tank 23 from the first master fluid pressure chamber 15 and the second master fluid pressure chamber 16 when these chambers are pressurized, the brake oil is prevented from flowing from the first master fluid pressure chamber 15 and the second master fluid pressure chamber 16 back to the master reservoir tank 23.

The power cylinder 4 consists of a tandem cylinder including a cylindrical power housing 31, a first power piston 32 and a second power piston 33 slidably received in the power housing 31. The first power piston 32 is positioned axially in a rear part of the power housing 31, and the second power piston 33 is positioned axially in a front part of the power housing 31. A first power fluid pressure chamber 35 is defined between the first power piston 32 and the second power piston 33, and a second power fluid pressure chamber 36 is defined between the front end of the power housing 31 and the second power piston 33. The first power piston 32 and the second power piston 33 are connected to each other via a connecting rod 37 so as to be relatively moveable within a prescribed range. The connecting rod 37 extends in the axial direction of the power housing 31, and has a front end fixedly connected to the second power piston 33 and a rear end moveably connected to the first power piston 32. Thereby, the maximum distance and the minimum distance between the first power piston 32 and the second power piston 33 are defined.

A return spring 38 consisting of a compression coil spring is interposed between the first power piston 32 and the second power piston 33, and another return spring 38 consisting of a compression coil spring is interposed between the second power piston 33 and the opposing end of the power housing 31. These return springs 38 urge the first power piston 32 and the second power piston 33 in the rearward direction of the power housing 31.

The power cylinder 4 further includes an electric motor 40 consisting of an electric servo motor (electric actuator) and a ball screw mechanism 42 to which the rotational force of the electric motor 40 is transmitted via a gear train 41. The ball screw mechanism 42 converts the rotational motion of the electric motor 40 into a forward movement of the first power piston 32 against the spring forces of the return springs 38. At the initial position, the first power piston 32 and the second power piston 33 are at the rear most positions thereof.

The power housing 31 is provided with a first power output port 45 communicating with the first power fluid pressure chamber 35, and a second power output port 46 communicating with the second power fluid pressure chamber 36. The power housing 31 is provided with a power reservoir tank 47 which supplies brake oil to the first power fluid pressure chamber 35 and the second power fluid pressure chamber 36 via fluid passages (not numbered) formed in the power housing 31. The power reservoir tank 47 communicates with the master reservoir tank 23 via a communication passage 48. Owing to per se known seal members (not numbered) that seal off the power reservoir tank 47 from the first power fluid pressure chamber 35 and the second power fluid pressure chamber 36 when these chambers are pressurized, the brake oil is prevented from flowing from the first power fluid pressure chamber 35 and the second power fluid pressure chamber 36 back to the power reservoir tank 47.

The first master output port 21 is connected to wheel cylinders 55 and 56 of the disk brakes 5 and 6 for the right and left rear wheels via a first fluid passage 51 and a VSA device 52 and via a left rear wheel fluid passage 53 and a right rear wheel fluid passage 54, respectively (first circuit system). The second master output port 22 of the master cylinder 3 is connected to wheel cylinders 65 and 66 of the disk brakes 7 and 8 for the right and left front wheels via a second fluid passage 61 and the VSA device 52 and via a left front wheel fluid passage 63 and a right front wheel fluid passage 64, respectively (second circuit system). The fluid passages in this case consist of tubing.

A first master cut valve 71 consisting of a normally open solenoid valve is provided on the first fluid passage 51, and a second master cut valve 72 consisting of a normally open solenoid valve is provided on the second fluid passage 61. A third fluid passage 73 branches off from the part of the first fluid passage 51 located between the VSA device 52 and the first master cut valve 71 (on a downstream side of the first master cut valve 71), and the first power output port 45 is connected to the terminal end of the third fluid passage 73. A fourth fluid passage 74 branches off from the part of the second fluid passage 61 located between the VSA device 52 and the second master cut valve 72 (on a downstream side of the second master cut valve 72), and the second power output port 46 is connected to the terminal end of the fourth fluid passage 74.

A fifth fluid passage 75 branches off from the part of the second fluid passage 61 between the master cylinder 3 and the second master cut valve 72 (on an upstream side of the second master cut valve 72), and a stroke simulator 76 is connected to the terminal end of the fifth fluid passage 75. The stroke simulator 76 includes a cylinder 77, a piston 78 slidably received in the cylinder 77 and a spring 79 interposed between the piston 78 and the opposing end wall of the cylinder 77 to urge the piston 78 in a prescribed direction in the cylinder 77. The piston 78 separates the interior of the cylinder 77 into a first fluid pressure chamber 81 communicating with the fifth fluid passage 75 and a second fluid pressure chamber 82. The spring 79 urges the piston 78 in the direction to diminish the first fluid pressure chamber 81. A simulator valve 84 consisting of a normally closed solenoid valve is provided on the fifth fluid passage 75.

The VSA device 52 includes a first brake actuator circuit 85 for controlling the disk brakes 5 and 6 (first circuit system) of the left and right rear wheels and a second brake actuator circuit 86 for controlling the disk brakes 7 and 8 (second circuit system) of the left and right front wheels. As the first and second brake actuator circuits 85 and 86 are identical in structure, only the first brake actuator circuit 85 is described in the following.

The first brake actuator circuit 85 includes a first VSA fluid passage 91 and a second VSA fluid passage 92 that are connected to the first fluid passage 51. Between the first fluid passage 51 and the first VSA fluid passage 91 are disposed a regulator valve 93 consisting of a normally open solenoid valve with a variable opening amount and a first check valve 94 that is connected in parallel to the regulator valve 93 and permits the flow of the brake fluid from the first fluid passage 51 to the first VSA fluid passage 91. Between the first VSA fluid passage 91 and the left rear wheel fluid passage 53 are disposed a first inlet valve 95 consisting of a normally open solenoid valve and a second check valve 96 that is connected in parallel to the first inlet valve 95 and permits the flow of the brake fluid from the left rear wheel fluid passage 53 to the first VSA fluid passage 91. Between the first VSA fluid passage 91 and the right rear wheel fluid passage 54 are disposed a second inlet valve 98 consisting of a normally open solenoid valve and a third check valve 99 that is connected in parallel to the second inlet valve 98 and permits the flow of the brake fluid from the right rear wheel fluid passage 54 to the first VSA fluid passage 91.

A first outlet valve 101 consisting of a normally closed solenoid valve is connected between the left rear wheel fluid passage 53 and the second VSA fluid passage 92, and a second outlet valve 102 consisting of a normally closed solenoid valve is connected between the right rear wheel fluid passage 54 and the second VSA fluid passage 92. A reservoir tank 103 is connected to the second VSA fluid passage 92. The reservoir tank 103 includes a cylinder connected to the second VSA fluid passage 92, a piston slidably received in the cylinder and a return spring that urges the piston toward the side of the second VSA fluid passage 92 so that the piston is displaced in response to the brake fluid that flows into the cylinder from the second VSA fluid passage 92. The components of the reservoir tank 103 are not numbered in the drawing.

Between the second VSA fluid passage 92 and the first fluid passage 51 are disposed a fourth check valve 108 that permits flow of the brake fluid from the second VSA fluid passage 92 to the first fluid passage 51 and a suction valve 109 that consists of a normally closed solenoid valve in series in that order from the side of the second VSA fluid passage 92. The node of the second VSA fluid passage 92 between the fourth check valve 108 and the suction valve 109 is connected to the first VSA passage 91 via a pump 111. The pump 111 is actuated by an electric motor 112, and transports the brake fluid from the side of the second VSA fluid passage 92 to the side of the first VSA fluid passage 91. The suction side (the side of the second VSA fluid passage 92) and the outlet side (the side of the first VSA fluid passage 91) of the pump 111 are provided with a fifth check valve 113 and a sixth check valve 114, respectively, for preventing the reversing of the flow of the brake fluid.

A first fluid pressure sensor 121 for detecting a fluid pressure is provided in the part of the first fluid passage 51 located between the first master cut valve 71 and the master cylinder 3. A second fluid pressure sensor 122 for detecting a fluid pressure is provided in the part of the second fluid passage 61 located between the second master cut valve 72 and the VSA device 52. A third fluid pressure sensor 123 for detecting a fluid pressure is provided in the part of the first fluid passage 51 located between the first master cut valve 71 and the VSA device 52.

A pedal position sensor 124 for detecting the position of the brake pedal 2 is provided in association with the brake pedal 2 as an operation amount detection means. The pedal position sensor 124 detects the pedal stroke that provides a measure of the braking operation amount (brake pedal stroke) caused by a vehicle operator, with the initial condition (zero pedal stroke) defined as the condition when the vehicle operator is not depressing the brake pedal 2.

The power cylinder 4 is provided with a motor angular position sensor 125 for detecting the rotational angular position of the electric motor 40. Each wheel is provided with a wheel speed sensor 126 for detecting the corresponding wheel rotational speed.

FIG. 2 is a block diagram showing a control system of the vehicle brake device. As shown in FIG. 2, an ESB_ECU 130 serving as an electronic control unit for the vehicle brake device receives signals output from the first to third fluid pressure sensors 121-123, the pedal position sensor 124, the motor angular position sensor 125 and the wheel speed sensors 126. Based on these signals, the ESB_ECU 130 controls the first and second master cut valves 71 and 72, the simulator valve 84, the power cylinder 4 and the VSA device 52.

The mode of operation of the vehicle brake device 1 having the structure discussed above is now described in the following. Under normal condition where the system is operating in a normal way, when the first fluid pressure sensor 121 has detected the depressing of the brake pedal 2 by a vehicle operator, the first and second master cut valve 71 and 72 consisting of normally open solenoid valves are energized and placed in the closed condition, and the simulator valve 84 consisting of a normally closed solenoid valve is energized and placed in the open condition. At the same time, the electric motor 40 of the power cylinder 4 is actuated so as to cause the first power piston 32 and the second power piston 33 to move forward, thereby generating brake fluid pressures in the first power fluid pressure chamber 35 and the second power fluid pressure chamber 36. These fluid pressures are transmitted to the wheel cylinders 55, 56, 65 and 66 of the corresponding disk brakes 5-8 via the third and fourth fluid passages 73 and 74, the first and second fluid passages 51 and 61, and the VSA device 52 in which the regulator valve 93 and the first and second inlet valves 95 and 98 are open, to thereby apply brakes to the respective wheels.

At this time, because the simulator valve 84 consisting of a normally closed solenoid valve is energized, and is therefore open, the brake fluid pressure generated in the second master fluid pressure chamber 16 is transmitted to the fluid pressure chamber of the stroke simulator 76 causing the piston 78 to be displaced against the spring force of the spring 79 with the result that the stroke of the brake pedal 2 is permitted, and a simulated pedal reaction force is produced.

When the VSA device 52 is not in operation, the regulator valve 93 is de-energized, and is hence open, the suction valve 109 is de-energized, and is hence closed, the first and second inlet valves 95 and 98 are de-energized, and are hence open, and the first and second outlet valves 101 and 102 are de-energized, and are hence closed. Therefore, the brake fluid pressures produced in the first fluid passage 51 and the second fluid passage 61 are supplied to the wheel cylinders 55, 56, 65 and 66 via the regulator valve 93 and the first and second inlet valves 95 and 98.

When the VSA device 52 is in operation, with the suction valve 109 energized and hence open, the pump 111 is activated so that the brake fluid pressurized by the pump 111 is supplied to the first VSA fluid passage 91 via the first and second fluid passages 51 and 61 and the suction valve 109. Therefore, by suitably energizing the regulator valve 93 to achieve a desired opening amount, the brake fluid pressure in the first VSA fluid passage 91 is adjusted, and this adjusted brake fluid pressure is selectively transmitted to the wheel cylinders 55, 56, 65 and 66 via the first and second inlet valves 95 and 98 that are open. As a result, even when the vehicle operator is not depressing the brake pedal 2, the braking forces of the four wheels can be individually adjusted so that the cornering property, the stability in a straight ahead condition and the anti-lock braking action of the brakes can be improved.

When the supply of electric power is lost, the first and second master cut valves 71 and 72 consisting of normally open solenoid valves are automatically opened, the simulator valve 84 consisting of a normally closed solenoid valve is automatically closed, the first and second inlet valves 95 and 98, along with the regulator valve 93, which are normally open solenoid valves, are automatically opened, and the first and second outlet valves 101 and 102, along with the suction valve 109, which are normally closed solenoid valves, are automatically closed. Under this condition, the brake fluid pressures produced in the first master fluid pressure chamber 15 and the second master fluid pressure chamber 16 of the master cylinder 3 are, without being absorbed by the stroke simulator 76, transmitted to the wheel cylinders 55, 56, 65 and 66 of the disk brakes 5-8 of the respective wheels via the first and second fluid passages 51 and 61, and the VSA device 52 so that the required braking forces can be produced without any problem.

The mode of control according to the present invention is described in the following. The present invention is applicable to a control situation where a buildup control is performed in a late phase of a braking action in response to depressing the brake pedal 2, typically, at a constant depressing stroke. The term "buildup control" as used herein means a control process for achieving a braking force in such a manner as intended by the vehicle operator, in spite of the fact that the braking force tends to diminish in a late phase of a braking action for a given pedal depression stroke owing to the decrease in the frictional coefficient of the brake device caused by the physical property thereof, by increasing the braking force in the late phase of the braking action without requiring the pedal depression stroke to be increased.

Figure 3:
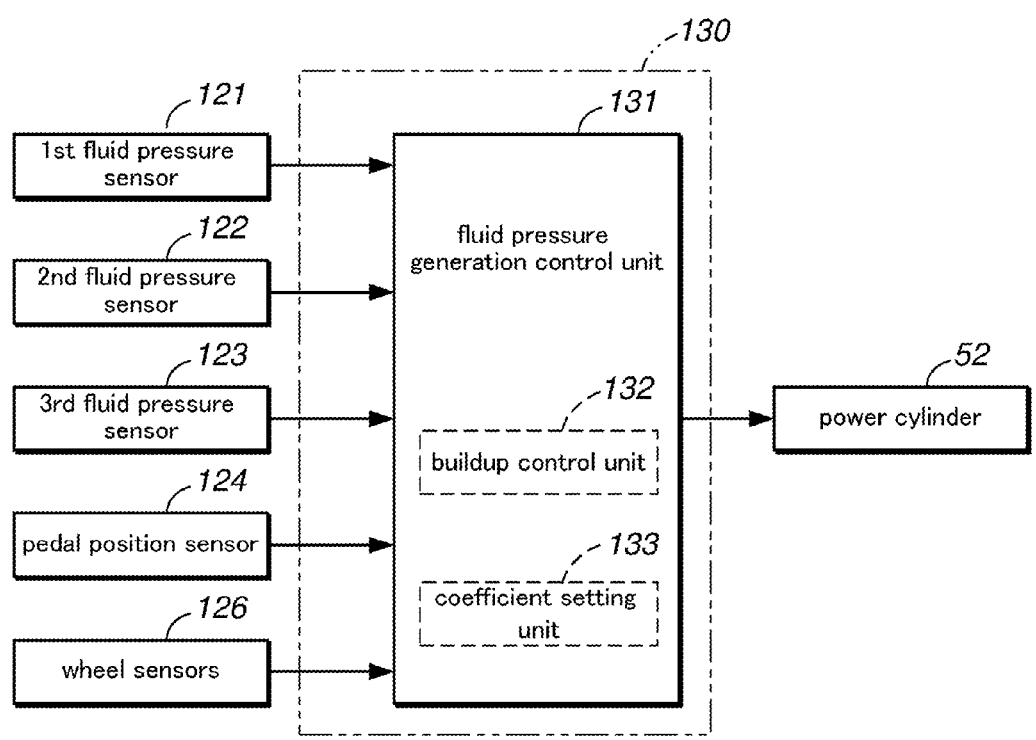
FIG. 3 is a block diagram of an essential part of the ESB_ECU which is relevant to the present invention.

FIG. 3 is a block diagram showing an essential part of the ESB_ECU 130 which is relevant to the present invention. The ESB_ECU 130 includes a fluid pressure generation control unit (fluid pressure generation means) 131 that receives output signals of the first to third fluid pressure sensors 121-123, a buildup control unit (buildup control means) 132 that may consist of an internal process of the fluid pressure generation control unit 131 and a coefficient setting unit 133 that may consist of an internal process of the fluid pressure generation control unit 131. The drive action of the power cylinder 4 is controlled by the output signal of the fluid pressure generation control unit 131.

Owing to the input and output structure illustrated in FIG. 3, the depression stroke of the brake pedal 2 given as an input from the vehicle operator is computed from the output signal of the pedal position sensor 124, and the vehicle speed given as a state of the vehicle is computed from the output signal of the wheel speed sensors 126 so that the buildup control of the present invention is carried out based on such inputs. This control process may be performed by software or by a computer executing a computer program.

Figure 4:
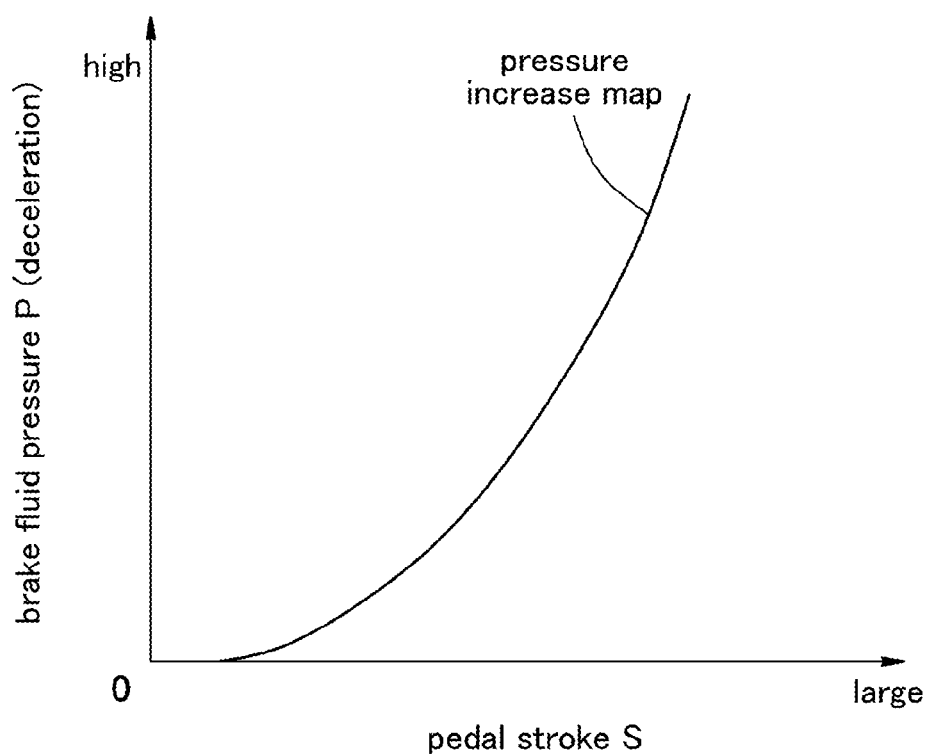
FIG. 4 is a map showing the changes of the brake fluid pressure P (target fluid pressure) depending on the pedal stroke S.

FIG. 4 is a pressure increase map showing the change of the value (target fluid pressure) of the brake fluid pressure P in dependence on the pedal stroke S. The pressure increase map is stored in the fluid pressure generation control unit 131. The solid line curve in FIG. 4 shows the way in which the brake fluid pressure rises as the depression stroke of the brake pedal 2 increases. This pressure increase map is configured such that the brake fluid pressure P rises relatively moderately for a given increase in the pedal stroke when the pedal stroke S is small (the depression stroke is small), and relatively sharply for the same given increase in the pedal stroke when the pedal stroke S is large (the depression stroke is large).

In addition to controlling the brake fluid pressure P according to the pressure increase map shown in FIG. 4, the coefficient setting unit 133 determines a plurality of coefficients a, b and c that are used as control gains from an early part of the braking operation for the buildup control (which will be described hereinafter).

Figure 5:
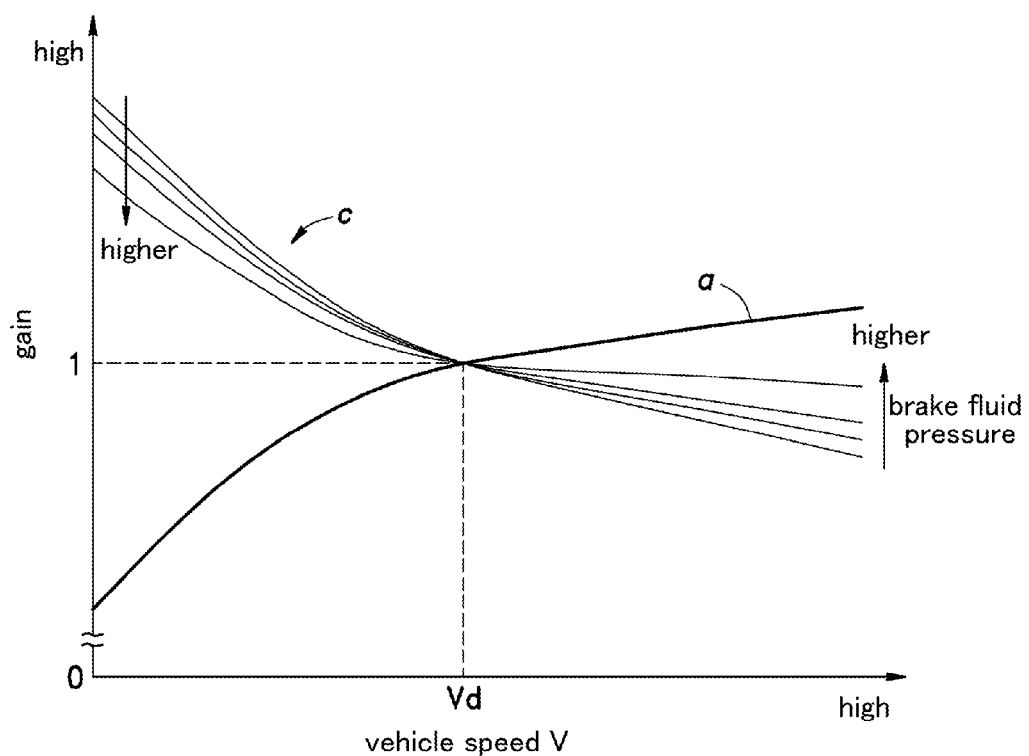
FIG. 5 is a map showing the changes of the coefficients a and c.

FIG. 5 is a map showing a coefficient a given as a first coefficient and a coefficient c given as one of two second coefficients (which will be described hereinafter). The coefficient a is a control gain for the vehicle speed V and increases to form a curved line as the vehicle speed V increases starting from V=0 (km/h) as shown in the drawing. The increase rate of this gain diminishes as the vehicle speed V increases. The gain is defined so as to be 1 at a prescribed intermediate speed Vd.

Figure 6:
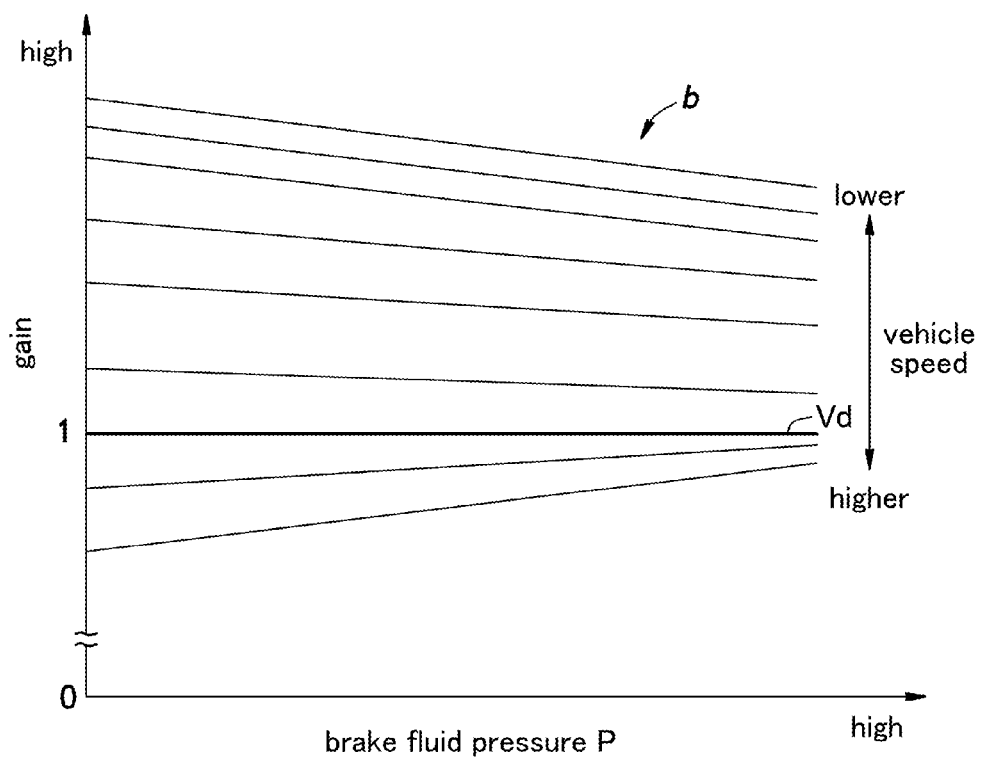
FIG. 6 is a map showing the changes of the coefficient b.

FIG. 6 is a map showing a coefficient b given as the other of the second coefficients. The coefficient b is a control gain for the brake fluid pressure P (which may be based on the signal from either one of the fluid pressure sensors 122 and 123), and varies depending on the vehicle speed V as shown in the drawing. As mentioned earlier, the coefficient b is fixed at the value of 1 without regard to the changes in the brake fluid pressure P when the vehicle speed is at the prescribed intermediate speed Vd. As can be appreciated from FIG. 6, the lower the vehicle speed V is, the greater the gain is, and vice versa. When the vehicle speed is lower than the prescribed intermediate speed Vd (as indicated by the lines slanting downward toward the right), the gain decreases at a constant decrease rate with an increase in the brake fluid pressure P. When the vehicle speed is higher than the prescribed intermediate speed Vd (as indicated by the lines slanting upward toward the right), the gain increases at a constant increase rate with an increase in the brake fluid pressure P.

One of the second coefficients, the coefficient c, is associated with the vehicle speed V as shown in FIG. 5, and decreases to form a curved line with an increase in the vehicle speed V from speed 0 km/h onward. The decrease rate of the second coefficient c changes depending on the brake fluid pressure P such that the higher the brake fluid pressure P is, the more moderate the decrease is, and vice versa. Also the decrease rate of the coefficient c diminishes as the vehicle speed V is increased. Again, the gain is equal to one at the prescribed intermediate speed Vd.

According to the present invention, a target gain K is computed from Equation 1 below by using these coefficients a, b and c.

$$K = a \times b \times c \quad \text{(Equation 1)}$$

The target gain K serves as a coefficient when determining a target fluid pressure Po according to the brake fluid pressure P obtained from the pressure increase map (base map) shown in FIG. 4, and the target fluid pressure Po is computed from Equation 2 given below.

$$Po = K \times (\text{brake fluid pressure } P \text{ obtained from the pressure increase map}) \quad \text{(Equation 2)}$$

First of all, the target gain K1 at an early time point of depressing the brake pedal 2 is obtained. The coefficient a is obtained from the map of FIG. 5 according to the vehicle speed V at the time of initiating the braking action upon depressing of the brake pedal 2. The coefficient a is maintained at a constant value during the course of the braking action including the time period in which the buildup control is performed by the buildup control unit 132. The coefficient b is obtained from the map of FIG. 6 by using the brake fluid pressure P at the time of initiating the braking action which is obtained from the map of FIG. 4 by using the pedal stroke S at an early time point of depressing the brake pedal 2. The coefficient c is obtained from the map of FIG. 5 according to the brake fluid pressure P and the vehicle speed V at the time of initiating the braking action.

Figure 7:
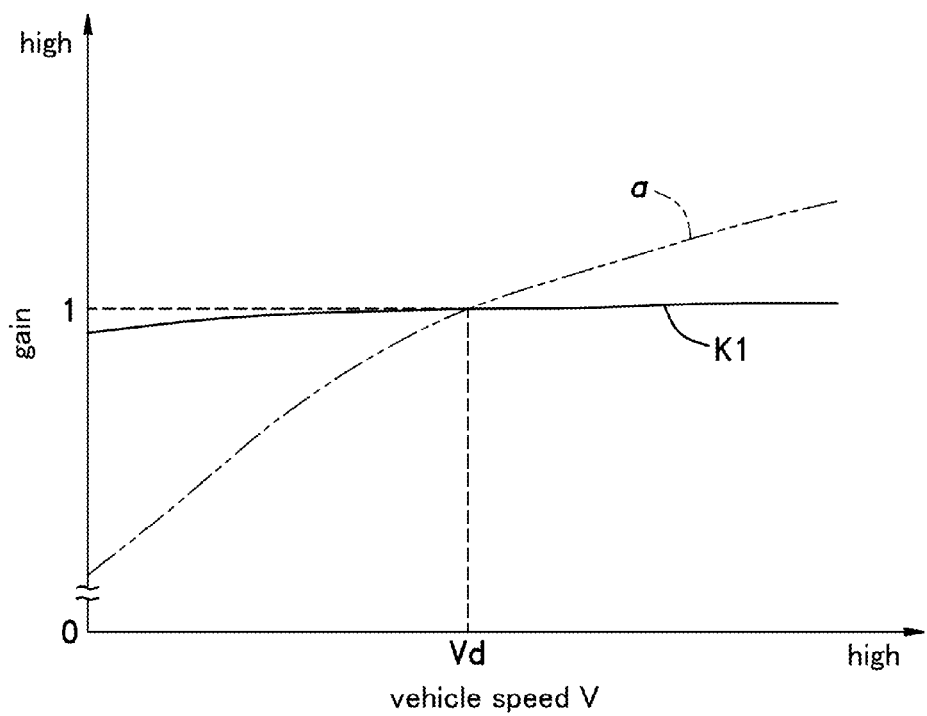
FIG. 7 is a map showing the changes in the target gain K1.

By using the coefficients a, b and c obtained in this manner, the initial target gain K1 (=a×b×c) is obtained from Equation 1. The initial target gain K1 changes as indicated by a curve K1 shown in FIG. 7. More specifically, because the coefficient a at the initial time point of the braking action is maintained during the braking action, the target gain K1 gradually increases as the vehicle speed increases as shown in the drawing. The target gain K1 is lower than 1 when the speed is lower than the prescribed intermediate speed Vd, 1 at the prescribed intermediate speed Vd and approximately one at higher speeds.

Thus, the brake fluid pressure P at an early point of a braking action can be given as a value that is appropriate for the given pedal stroke S and for the given vehicle speed V so that the deceleration at the early point of the braking action can be made substantially constant without regard to the vehicle speed, and a braking action which is both comfortable and manageable can be achieved.

Figure 8:
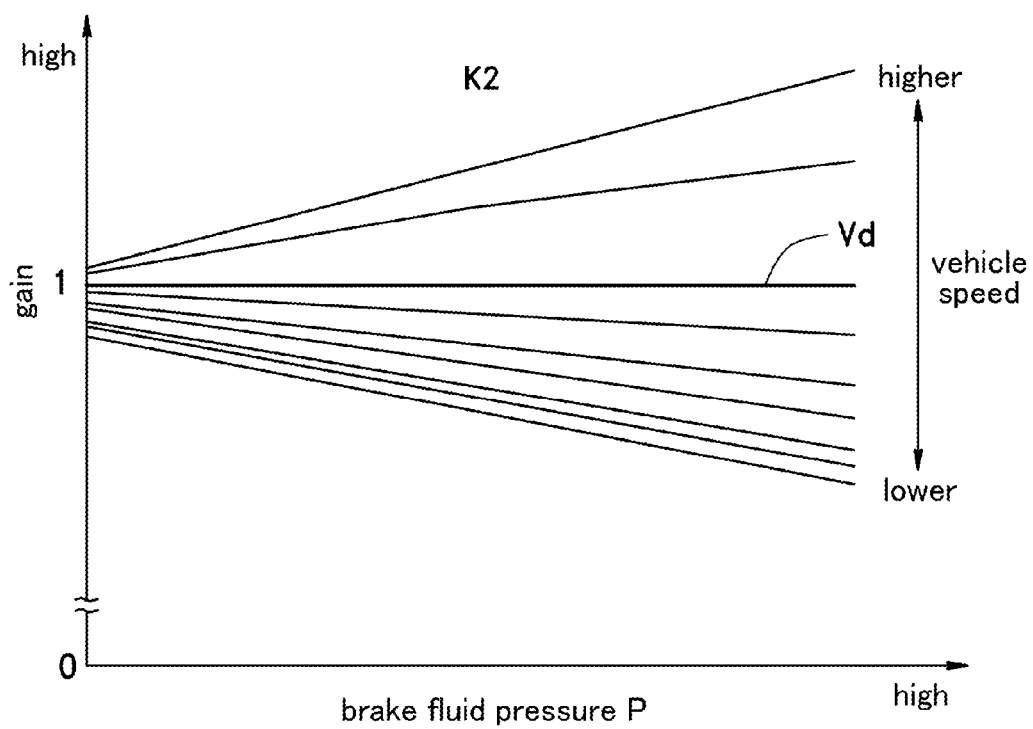
FIG. 8 is a map showing the changes in the target gain K2.

The target gain K2 that can be applied during the time of depressing the brake pedal 2 is discussed in the following. By changing the second coefficients (b and c) during the course of the braking action according to the brake fluid pressure P, the target gain K2 at the time of depressing the brake pedal 2 changes as shown in FIG. 8 owing to the relationship given by Equation 1. The target gain K2 at the time of depressing the brake pedal 2 is near the value of 1 when the brake fluid pressure P is on the low side, and is fixed at the value of 1 at the prescribed intermediate speed Vd without regard to the changes in the brake fluid pressure P. When the vehicle speed is higher than the prescribed intermediate speed Vd, the target gain K2 increases with an increase in the brake fluid pressure P. When the vehicle speed is lower than the prescribed intermediate speed Vd, the target gain K2 decreases with an increase in the brake fluid pressure P.

Thereby, the control gain for the pedal stroke S (brake fluid pressure P) at the time of initiating the braking action can be adjusted in dependence on the vehicle speed V, in particular, such that the gain is smaller on the low speed side. As a result, the onset of a deceleration for a given pedal stroke S can be controlled to be a mild one. Thus, the control of the braking action at the time of initiating the depression of the brake pedal can be improved. Also, because the target gain is changed as shown in the drawings depending on the brake fluid pressure P during the braking action, the gain is caused to approach 1 as the vehicle is decelerated to a desired speed and the pedal stroke S is therefore slightly released (the brake fluid pressure P is reduced), so that the vehicle can be decelerated in a manner corresponding to the pedal stroke S.

Figure 9:
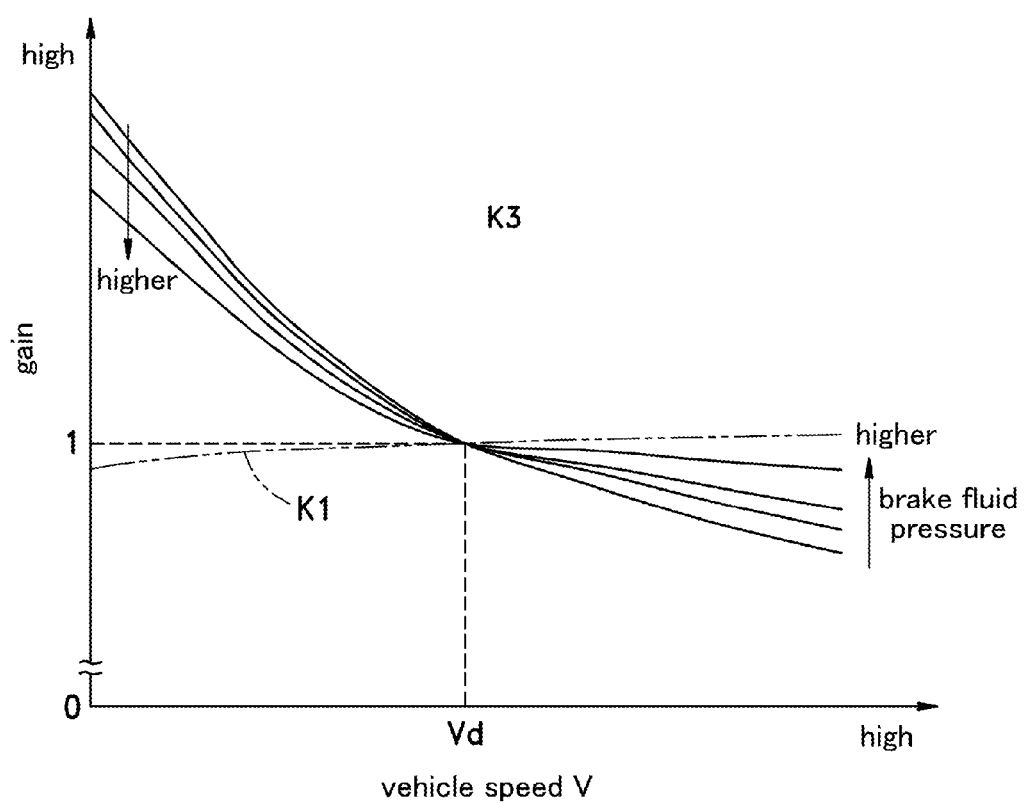
FIG. 9 is a map showing the changes in the target gain K3.

The target gain K3 which may be considered as a buildup gain is described in the following. During the braking action, by changing the second coefficients (b and c) according to the vehicle speed V, the target gain K1 shown in FIG. 7 above is modified into the target gain K3 which is given by Equation 1 and builds up as shown in FIG. 9. The target gain K3 for buildup control is greater than 1 when the vehicle speed is lower than the prescribed intermediate speed Vd, and is less than 1 when the vehicle speed is higher than the prescribed intermediate speed Vd. The target gain K3 increases sharply as the vehicle speed is decreased on the low speed side, and increases relatively mildly as the vehicle speed is increased on the high speed side. As for the influences of the brake fluid pressure P, the target gain K3 becomes smaller as the brake fluid pressure P increases on the low speed side, and approaches 1 as the brake fluid pressure P increases on the high speed side.

As a result, when the vehicle is decelerated with the brake pedal 2 depressed by a certain stroke, for instance, as the target gain K3 increases as the vehicle speed V decreases, even though the frictional coefficient of the brake device decreases and, hence, the braking force decreases in a latter phase of the braking action, a favorable buildup control that progressively increases the brake fluid pressure P can be achieved, and this buildup control at the time of deceleration causes the vehicle operator to perceive a sense of a high security.

According to the present invention, the target gain K that is used as a coefficient for determining the target brake fluid pressure based on the brake fluid pressure P obtained from the pressure increase map during a course of a braking action can be computed by Equation 1 so that a favorable buildup control can be achieved by using the coefficients a, b and c.

Figure 10A:
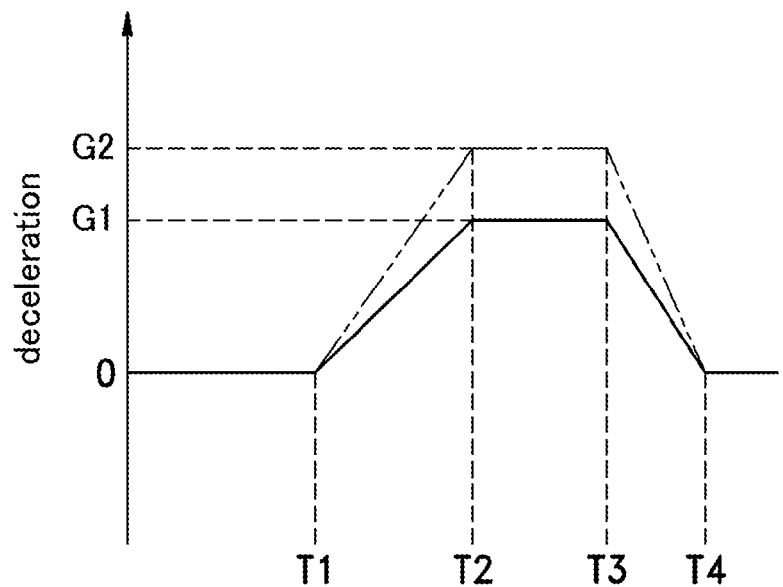
FIG. 10 shows (a) the changes of the deceleration with time and (b) the changes of the deceleration with a decrease in the vehicle speed.

FIG. 10(a) shows the changes in the deceleration during the course of a braking action in the case of the present invention (indicated by the solid line) and in the case of the prior art (indicated by the double-dot chain-dot line) where the brake fluid pressure P as obtained from the brake stroke S is used. The braking action is initiated at time point T1, and the depressing stroke of the brake pedal 2 is kept constant from time point T2 onward until the brake pedal 2 is released at time point T3. According to the prior art, the vehicle starts decelerating in dependence on the brake fluid pressure P corresponding to the pedal stroke S without regard to the vehicle speed V. However, according to the present invention, the vehicle speed at the time of starting the braking action is taken into account (coefficient a). Therefore, the control gain becomes smaller with a decrease in the vehicle speed V so that the deceleration G at an early phase of the braking action is restrained as compared to the prior art, and rises gradually. As a result, at an extremely low speed such as when trying to park the vehicle, even when the brake pedal is depressed in a somewhat excessive manner, the braking force is produced in a mild manner so that the vehicle is prevented from abruptly coming to a stop. When the vehicle is traveling at a high speed, the gain owing to the coefficient a is relatively high so that the braking action takes effect without much delay so that the vehicle operator is enabled to decelerate the vehicle with a confidence.

During the course of the braking operation, the gain owing to the coefficient b in dependence on the brake fluid pressure P is in effect, and the coefficient b approaches 1 as the brake fluid pressure P gets higher over the entire speed range. In this case, as the depression stroke S increases, the change in the target fluid pressure for each given incremental increase in the pedal stroke of the brake pedal 2 diminishes, and the change in the target fluid pressure for a given change in the depression stroke becomes mild. As a result, the brake control by the vehicle operator during the braking operation can be improved.

Figure 10B:
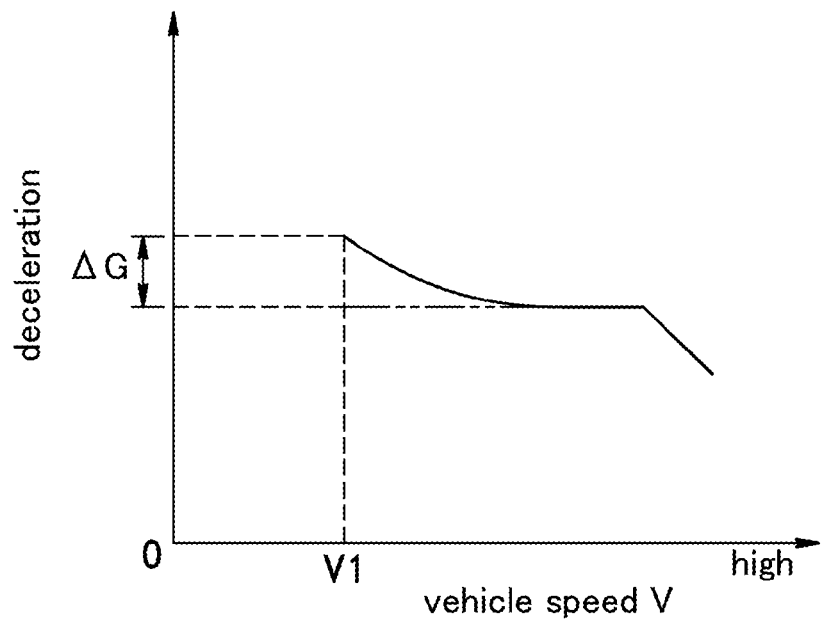

In a late phase of the braking action, owing to the coefficient c which increases the gain with a decrease in the vehicle speed V, the control gain K3 increases with an added increase rate as the vehicle speed decreases so that the deceleration G increases with the decrease in the vehicle speed as shown in FIG. 10(b). This drawing shows that the deceleration G caused by a constant pedal stroke S increases by ΔG from a constant deceleration by the time the vehicle speed V drops to a certain speed V1. Thus, when the braking operation is performed with a constant pedal stroke S, the deceleration increases as the vehicle speed decreases so that a favorable buildup effect can be achieved.

Owing to such a buildup control, the vehicle operator is not required to depress the brake pedal 2 further down during the course of a braking operation owing to the sensing of a decline in the deceleration so that the desired deceleration can be achieved with a light pedal stroke in a comfortable manner. Even when the brake pedal is depressed with a large pedal stroke S at an extremely low vehicle speed, the vehicle is prevented from abruptly decelerating so that the vehicle occupant is prevented from experiencing any discomfort.

The present invention was described in terms of a specific embodiment, but the present invention is not limited by the illustrated embodiment, and can be changed in various parts thereof without departing from the spirit of the present invention. The various components in the illustrated embodiment are not entirely indispensable for the working of the present invention, but may be appropriately omitted or substituted without departing from the spirit of the present invention. The illustrated embodiment was based on the use of coefficients, but may also use various pre-set maps, instead of the coefficients, in performing similar control processes.

GLOSSARY 1 vehicle brake device
2 brake pedal (braking operation member)

4 power cylinder (electric actuator)
124 pedal position sensor (operation amount detection means)
126 wheel speed sensor (vehicle speed detection means)
131 fluid pressure generation control unit (fluid pressure generation means)
132 buildup control unit (buildup control means)
133 coefficient setting unit (buildup control means)

The invention claimed is:

1. A vehicle brake device, comprising:
   an operation amount detection means for detecting a braking operation amount of a braking operation member operated by a vehicle operator;
   a fluid pressure generation means for generating a brake fluid pressure in dependence on the braking operation amount by actuating an electric actuator;
   a vehicle speed detection means for detecting a vehicle speed; and
   a buildup control means for increasing the brake fluid pressure with a decrease in the vehicle speed when the brake fluid pressure is generated by the fluid pressure generating means in dependence on the braking operation amount;
   wherein the buildup control means is configured to adjust a target control value set in dependence on the braking operation amount by taking into account the vehicle speed at an initial time point of a braking operation by the vehicle operator and the vehicle speed and braking operation amount during the braking operation.

2. The vehicle brake device according to claim 1, wherein the target control value is adjusted by using a first coefficient determined in dependence on the vehicle speed at the initial time point of the braking operation and a second coefficient determined in dependence on the braking operation amount and the vehicle speed during the braking operation.

3. The vehicle brake device according to claim 2, wherein the first coefficient becomes greater with an increase in the vehicle speed, and is fixed at a constant value during the braking operation.

4. The vehicle brake device according to claim 2, wherein the second coefficient changes by a relatively small amount for a given change in the vehicle speed when the vehicle speed is higher than a prescribed vehicle speed, and by a relatively great amount for a given change in the vehicle speed when the vehicle speed is lower than the prescribed vehicle speed.

5. The vehicle brake device according to claim 2, wherein the second coefficient approaches 1 as the braking operation amount increases.

6. The vehicle brake device according to claim 1, wherein the target control value consists of a brake fluid pressure that is generated in dependence on the braking operation amount.

7. The vehicle brake device according to claim 2, wherein the target control value consists of a brake fluid pressure that is generated in dependence on the braking operation amount.

8. The vehicle brake device according to claim 3, wherein the target control value consists of a brake fluid pressure that is generated in dependence on the braking operation amount.

9. The vehicle brake device according to claim 4, wherein the target control value consists of a brake fluid pressure that is generated in dependence on the braking operation amount.

10. The vehicle brake device according to claim 5, wherein the target control value consists of a brake fluid pressure that is generated in dependence on the braking operation amount.

* * * * *